(12) United States Patent
Kugo et al.

(10) Patent No.: US 7,056,552 B2
(45) Date of Patent: *Jun. 6, 2006

(54) HEAT-SENSITIVE ADHESIVE MATERIAL

(75) Inventors: Tomoyuki Kugo, Shizuoka (JP); Toshiaki Ikeda, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 129 days.

This patent is subject to a terminal disclaimer.

(21) Appl. No.: 10/229,450

(22) Filed: Aug. 28, 2002

(65) Prior Publication Data

US 2004/0043236 A1    Mar. 4, 2004

(51) Int. Cl.
*B05D 5/10* (2006.01)
*B32B 27/30* (2006.01)
*C08J 3/22* (2006.01)

(52) U.S. Cl. .................. 427/208.2; 428/500; 524/326; 524/343; 524/347; 524/425; 524/472; 524/478; 524/409; 524/488; 524/489

(58) Field of Classification Search ................ 524/487, 524/488, 478, 489, 472, 425, 760, 757, 326, 524/343, 347; 428/500; 427/208.2
See application file for complete search history.

(56) References Cited

U.S. PATENT DOCUMENTS 5,912,204 A * 6/1999 Yamada et al. ............. 503/200
6,500,536 B1 * 12/2002 Yamada et al. ............. 428/346

FOREIGN PATENT DOCUMENTS

| EP | 1193284 A1 | 4/2002 |
|---|---|---|
| JP | 6221835 | 5/1987 |
| JP | 6404681 | 1/1989 |
| JP | 6057223 | 3/1994 |
| JP | 6100847 | 4/1994 |
| JP | 6100848 | 4/1994 |
| JP | 8-325535 | 12/1996 |
| JP | 9169870 | 6/1997 |
| JP | 10-152660 | * 6/1998 |
| JP | 10152660 | 6/1998 |
| JP | 0073022 | 3/2000 |
| JP | 2002-114954 | 4/2002 |
| JP | 0114954 | 4/2002 |

OTHER PUBLICATIONS

U.S. Appl. No. 09/962,495, filed Sep. 25, 2001.
U.S. Appl. No. 09/557,033, filed Apr. 21, 2000.
U.S. Appl. No. 661,444, filed Sep. 13, 2000.

* cited by examiner

*Primary Examiner*—Tae H. Yoon
(74) *Attorney, Agent, or Firm*—Cooper & Dunham LLP

(57) ABSTRACT

A heat-sensitive adhesive material includes a substrate, a heat-sensitive adhesive layer containing a thermoplastic resin and a solid plasticizer formed on the substrate, and a heat-fusible substance capable of depressing the solidifying point of the solid plasticizer in at least one of the heat-sensitive adhesive layer and a layer adjacent to the heat-sensitive adhesive layer. The heat-fusible substance satisfies the following condition (A): $E1<E2$ where $E1$ is heat energy to fuse the solid plasticizer; and $E2$ is heat energy to fuse the heat-fusible substance.

10 Claims, 1 Drawing Sheet

HEAT-SENSITIVE ADHESIVE MATERIAL

BACKGROUND OF THE INVENTION

1. Field of the Invention

The present invention relates to a heat-sensitive adhesive sheet which does not have adhesion or has very low adhesion at ordinary temperature, but exhibits adhesion at the time of heating and keeps its adhesion even after exhibiting adhesion.

2. Description of the Related Art

Adhesive sheets for labeling have been increasingly used in labels such as labels for pricing, labels for trade description (bar codes), labels for quality indication, labels for measure indication, and labels for advertisement. Information is recorded on these labels by ink-jet recording, thermal recording, pressure-sensitive recording, and other various recording procedures. Conventional adhesive sheets each with a release paper and an adhesive layer laminated on the side opposite to the information recording side of such labels have been widely used, since these adhesive sheets can be easily applied to an adherend only by removing the release paper and pressing the adhesive sheets onto the adherend. The release papers of these conventional adhesive sheets are removed before use, but the removed release papers are not recovered and recycled and are disposed in most cases. The adhesive layer (pressure-sensitive adhesive layer) has tackiness or adhesion and is very difficult to handle after removal of the release paper. For example, when an adhesive sheet is placed on an adhered accidentally and an attempt is made to remove the adhesive sheet in order to apply the same properly, the adhesive sheet becomes curled or wrinkled and breaks at worse.

Accordingly, heat-sensitive adhesive sheets that do not have adhesion at ordinary temperature and do not require release papers have received attention. Such heat-sensitive adhesives comprise a solid plasticizer and/or a liquid plasticizer and a thermoplastic resin emulsion as essential components and contain a tackifier and other additives. This type of heat-sensitive adhesives is applied to a side of a substrate opposite to a printed side and thereby yields a heat-sensitive adhesive material. The surface of an adhesive layer of the heat-sensitive adhesive material has no adhesion at ordinary temperature, but exhibits adhesion when heatted and keeps its adhesion for a while after removal of a heat source. In this type of heat-sensitive adhesive materials, the solid plasticizer first fuses and dissolves the thermoplastic resin and the tackifier to thereby exhibit adhesion. The liquid plasticizer is generally encapsulated in a microcapsule, and the shell (microcapsule) breaks or allows the liquid plasticizer to pass there through by heating, and the liquid plasticizer dissolves the thermoplastic resin emulsion and the tackifier to thereby exhibit adhesion, as in the solid plasticizer. The heat-sensitive adhesive materials do not require release papers and are advantageous from the points of resource saving and environmental protection, in contrast to the conventional adhesive materials.

In addition, the heat-sensitive adhesive materials do not exhibit adhesion under room temperature, therefore it easily comes off once it is accidentally applied on to the adherends. Moreover, it is advantageous in that once an accurate place is determined on the adherends, the heat-sensitive adhesive materials could be adhered only by adding heat thereon.

Some of such conventional heat-sensitive adhesive materials have some problems, although they have the advantages as above. One of these problems is adhesive strength thereof. Food plastic wrap for use in, for example, food point-of-sales (POS) systems has been changed from poly(vinyl chloride) wrap to polyolefin wrap to avoid production of dioxins and other environmental issues. POS labels are applied to such polyolefin wrap, but exhibit much lower adhesion and wettability with the polyolefin wrap than with the poly(vinyl chloride) wrap and are easily peeled off. Improvement in adhesion and wettability with the polyolefin wrap has been made on the regular adhesive materials comprising adhesives and release papers. An attempt to improve adhesion to the polyolefin wrap has also been made on the conventional heat-sensitive adhesive materials, but sufficient results have not yet been obtained.

Another one of the problems is decreased adhesive strength with respect to ambient and/or adherends at low temperatures. The heat-sensitive adhesive materials are used as POS labels for fresh food such as meat and fish that is refrigerated to keep its freshness. The heat-sensitive adhesive materials as the POS labels are applied to such refrigerated adherends as well as to adherends at low temperatures. However, the conventional heat-sensitive adhesive materials do not have sufficient adhesive strength to ambient and/or adherends at low temperatures. In addition, the POS labels are also applied to hot deli and other adherends and/or ambience at temperatures higher than ordinary temperature. Accordingly, the POS labels must be applied at temperatures over a wide range from low temperatures through ordinary temperature to high temperatures. However, the conventional heat-sensitive adhesive materials cannot be applied to ambience and adherends at temperatures over a wide range and are therefore unfriendly for use in, for example, supermarkets. Japanese Patent Application Laid-Open JP-A) No. 64-4681 discloses means of using a thermoplastic resin emulsion in which a resin having a lower Tg is covered with another resin having a higher Tg. However, the resulting thermoplastic resin composition does not exhibit high adhesion at temperatures over a wide range from low temperatures through ordinary temperature to high temperatures, since the two resins exhibit decreased compatibility (miscibility) with each other even after activation.

A third one of the problems is blocking. Blocking is a phenomenon in which adhesion or adhesive property is expressed where adhesion is not intended. Blocking may be induced, for example, when a heat-sensitive adhesive material is exposed to temperatures higher than ordinary temperature. Once blocking occurs, the heat-sensitive adhesive layer adheres to an outer surface (a side of the substrate opposite to the heat-sensitive adhesive layer) to thereby obstacle paper feed and adversely affect printing procedures on the outer side. This phenomenon occurs in either of the cases where the POS label is rolled and where it is cut to sheets and is stacked.

As solutions to prevent blocking, proposes are made on a process of adding a lubricant wax to a heat-sensitive adhesive (Japanese Patent Application Publication (JP-B) No. 62-21835), a process of adding an aliphatic metal salt to the heat-sensitive adhesive (JP-A No. 2000-73022), and a process in which the surface of a solid plasticizer is protected with an inorganic compound or a colloid particle to inhibit softening of the solid plasticizer to thereby prevent blocking (JP-A No. 06-57223, JP-A No. 06-100847, and JP-A No. 06-100848). However, the addition of wax does not sufficiently effectively prevent blocking but, instead, deteriorates adhesion. When the surface of the solid plasticizer is protected with an inorganic compound or colloid particle, it takes long for the solid plasticizer to fuse and to diffuse, and therefore it takes long for the resulting heat-sensitive adhesive to exhibit adhesion. Accordingly, the heat-sensitive adhesive exhibits deteriorated adhesion properties and is not suitable for practical use. Blocking can be mitigated by using a plasticizer having a high melting point, but the adhesive strength of the resulting heat-sensitive adhesive is significantly decreased. Accordingly, the heat-sensitive adhesive materials are transported and stored at such low temperatures as to avoid blocking under present circumstances.

SUMMARY OF THE INVENTION

Accordingly, it is an object of the present invention to provide a heat-sensitive adhesive material that exhibits satisfactory adhesive strength to adherends and/or ambience at temperatures over a wide range from low to high temperatures and does not invite blocking with counter surfaces even at high temperatures.

After intensive investigations on heat-sensitive adhesive materials, the present inventors have accomplished the present invention.

The present invention provides the following heat-sensitive adhesive material and method for activating (or to activate adhesive property) the heat-sensitive adhesive material and method for applying the heat-sensitive adhesive material.

Specifically, the present invention provides, in a first aspect, a heat-sensitive adhesive material including a substrate; a heat-sensitive adhesive layer mainly containing a thermoplastic resin and a solid plasticizer, formed on the substrate; and a heat-fusible substance capable of depressing the solidifying point of the solid plasticizer, which heat-fusible substance is present in at least one of the heat-sensitive adhesive layer and a layer adjacent to the heat-sensitive adhesive layer. In the heat-sensitive adhesive material, the heat-fusible substance satisfies the following condition (A): E1<E2 wherein E1 is heat energy to fuse the solid plasticizer; and E2 is heat energy to fuse the heat-fusible substance.

In the heat-sensitive adhesive material, the heat-fusible substance preferably constitutes fine composite particles including the heat-fusible substance and a thermal-response retarder capable of increasing the heat energy E2.

The fine composite particles may include 5% to 50% of the heat-fusible substance based on the total amount of the fine composite particles.

The fine composite particles preferably have an average particle diameter of from 0.5 to 50.0 µm.

A heat-fusible substance having a melting point of 60° C. to 150° C. is preferably used as the heat-fusible substance.

The fine composite particles may include fine pores dispersed inside thereof.

The heat-fusible substance is preferably a compound having a molecular structure containing the same functional group skeleton with the solid plasticizer.

The heat-fusible substance may be one selected from of wax, naphthol derivatives, biphenyl derivatives, polyether compounds, carbonic acid diester derivatives and oxalic acid diester derivatives.

An acrylonitrile-styrene resin is preferably used as the thermal-response retarder.

The thermoplastic resin in the heat-sensitive adhesive material may include 2-ethylhexyl acrylate as a monomer component, and the solid plasticizer may include at least one selected from the compounds (a), (b) and (c) expressed by the following Chemical formula (A):

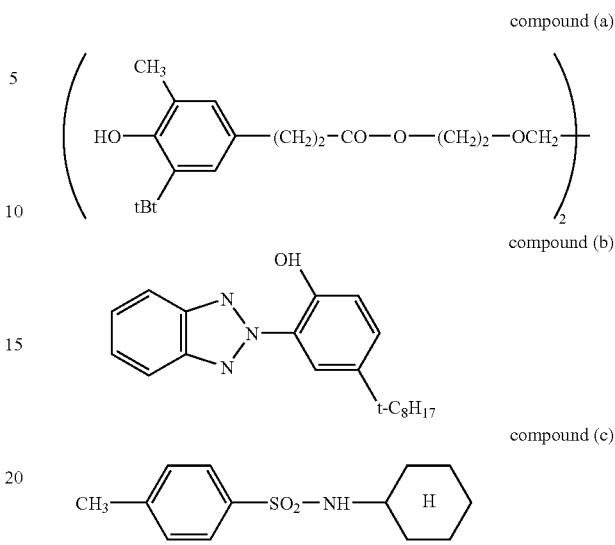

in the Chemical Formula (A), tBt expresses a tertiary butyl.

The heat-sensitive adhesive material may further include a thermal recording layer which is formed on the substrate on the opposite side to the heat-sensitive adhesive layer and mainly contains a leuco dye and a developer.

The heat-sensitive adhesive material may further include an underlying layer which is formed between the heat-sensitive adhesive layer and the substrate and contains airspace.

The present invention provides, in a second aspect, a method for activating the aforementioned heat-sensitive adhesive material. The method includes the steps of applying energy to the heat-sensitive adhesive material using a thermal head; and controlling the quantity of the applied energy by means of varying the conducting period of the thermal head.

The method just mentioned above may be used for applying the the applied energy may be determined based on at least one of an adherend temperature and an ambient temperature.

In the method, one of energy E3 and E4 satisfying the following condition (B) may be applied:

(B): E3<E4 wherein E3 is energy to exhibit the maximum adhesive strength when one of the adherend temperature and the ambient temperature is T1; and E4 is energy to exhibit the maximum adhesive strength when one of the adherend temperature and the ambient temperature is T2 lower than T1.

In the method, it is preferred that the quantity of the applied energy is E5 to exhibit the maximum adhesive strength at temperatures of T3 or higher when one of the adherend temperature and the ambient temperature is T3 or higher; and the quantity of the applied energy is E6 to exhibit the maximum adhesive strength at temperatures lower than T3 when one of the adherend temperature and the ambient temperature is lower than T3, wherein T3 is the minimum temperature for the heat-sensitive adhesive material to exhibit adhesive strength required for adhesion without fusing the heat-fusible substance.

Alternatively, the quantity of the applied energy may be E1 or more and less than E2 when one of the adherend temperature and the ambient temperature is T3 or higher; and the quantity of the applied energy may be E2 or more when one of the adherend temperature and the ambient temperature is lower than T3.

In addition and advantageously, the present invention provides a method for applying the aforementioned heat-sensitive adhesive material. The method includes the steps of applying energy to the heat-sensitive adhesive material using a thermal head to exhibit adhesion to thereby apply the heat-sensitive adhesive material to an adherend.

In the method just mentioned above, the quantity of the applied energy may be controlled by varying the conduction period of the thermal head.

The adherend in the method is preferably a polyolefin adhered.

The heat-sensitive adhesive material of the present invention exhibits high adhesive strength to polyolefin wrap and to poly(vinyl chloride) wrap at temperatures over a wide range from low temperatures to high temperatures. In addition, it has excellent blocking preventing property even when it carries a heat-sensitive chromogenic layer on an opposite side. By using a hollow underlying layer, the heat-sensitive adhesive material becomes further resistant to bleeding of the heat-sensitive chromogenic layer.

DESCRIPTION OF THE PREFERRED EMBODIMENTS

Figure 1A:
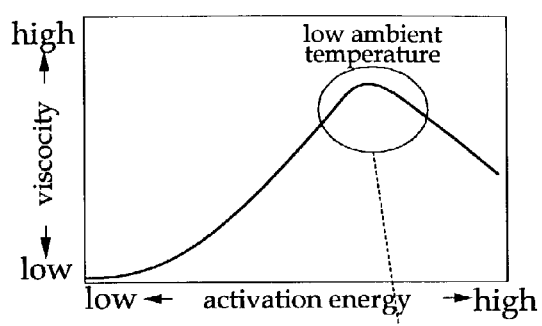
FIGS. 1A, 1B and 1C are graphs showing the relation between the applied energy and the resulting adhesive strength by the use of a heat-sensitive adhesive material.

In conventional heat-sensitive adhesive materials, the solid plasticizer once fused by heating solidifies again at low temperatures and the thermoplastic resin loses its adhesive strength. The use of a heat-fusible substance that retards solidification of the solid plasticizer which fuses by heating and becomes liquid can solve this problem. However, the resulting heat-sensitive adhesive material becomes excessively soft at high temperatures and cannot stably exhibit satisfactory adhesive strength at temperatures over a wide range. To solve these problems, the present invention employs a solid plasticizer that satisfies the condition (A) and a heat-fusible substance that depresses the solidifying point of the solid plasticizer in the heat-sensitive adhesive layer and/or in a layer adjacent to the heat-sensitive adhesive layer. More specifically, in a case of $E1 \geq E2$ by contrast to the condition (A), the heat-fusible substance fuses prior to the solid plasticizer, and the resulting resin becomes excessively soft and decreases in its adhesive strength at high temperatures, although it exhibits high adhesion at low temperatures since the solid plasticizer keeps its liquid state as mentioned above. In other words, the use of the heat-fusible substance satisfying the condition (A) and depressing the solidifying point of the solid plasticizer enables to retard fusing of the heat-fusible substance as compared with the solid plasticizer and enables to control, by adjusting the quantity of applied energy, whether or not the heat-fusible substance fuses at each ambient temperature and to control at which time the heat-fusible substance fuses.

In conventional heat-sensitive adhesive materials, the solid plasticizer once fused by heating solidifies again at low temperatures and the thermoplastic resin loses its adhesive strength. The use of a heat-fusible substance that retards solidification of the solid plasticizer which fuses by heating and becomes liquid can solve this problem. In addition, by allowing the solid plasticizer and the heat-fusible substance to satisfy the condition (A), the resulting heat-sensitive adhesive material can exhibit high adhesion at temperatures over a wide range from low to high temperatures.

To satisfy the condition (A) more efficiently, the heat-fusible substance preferably constitutes fine composite particles containing the heat-fusible substance and a thermal-response retarder collectively forming a particle mass (hereinafter briefly referred to as "composite fine particles"). The heat-fusible substance serves to depress the solidifying point of the solid plasticizer and the thermal-response retarder serves to enable the heat-fusible substance to satisfy the condition (A). By compounding the heat-fusible substance and the thermal response retarder into such composite fine particles, the fluidity of the heat-fusible substance can be controlled and the resulting heat-sensitive adhesive material can exhibit high adhesion at temperatures over a wide range, including not only low temperatures but also high temperatures. The composite fine particles may further include assistants for controlling the fluidity, such as wax, in order to control the fluidity of the heat-fusible substance more smoothly.

In addition, the present inventors have verified that the use of a compound having a molecular structure containing the same functional group skeleton with the solid plasticizer as the heat-fusible substance that depresses the solidifying point of the solid plasticizer is effective for exhibiting higher adhesion at low temperatures. Specifically, by using such a heat-fusible substance having a molecular structure having the same functional group skeleton with the solid plasticizer, the heat-fusible substance becomes highly compatible or miscible with the solid plasticizer, more effectively depresses the solidifying point of the solid plasticizer once fused to thereby keep the solid plasticizer in its liquid state, and the resulting heat-sensitive adhesive material can exhibit higher adhesion at low temperatures.

The content of the heat-fusible substance in the composite fine particles is preferably 5% to 50% and more preferably 10% to 30% based on the total amount of the composite fine particles. Within this range, the heat-fusible substance may have an appropriate sensitivity during fusion by heating and its flowability can be controlled more easily.

The average particle diameter (volume average particle diameter) of the composite fine particles is preferably 0.5 to 50.0 μm and more preferably 1.0 to 30.0 μm. The measurement of an average particle diameter may be performed for instance, by LA700 (Horiba, Ltd.) Within this range, the heat-fusible substance may have an appropriate sensitivity during fusion by heating and its flowability can be controlled more easily.

In addition, the melting point of the heat-fusible substance is preferably 60° C. to 150° C. and more preferably 70° C. to 130° C. Within this range, the heat-fusible substance may have an appropriate sensitivity during fusion by heating and its flowability can be controlled more easily.

Alternatively, the composite fine particles preferably include fine pores or airspace inside thereof to enable the resulting heat-sensitive adhesive material to exhibit higher adhesion at low temperatures. When the heat-fusible substance fuses by application of heat energy and becomes liquid, the liquid heat-fusible substance can more easily flow out through such fine pores.

Heat-fusible substances that depress the solidifying point of the solid plasticizer, which is used for the composite fine particles, include a variety of things. The specific examples include wax such as N-hydroxymethyl stearate amide, stearate amide, methyl stearate, amide palmitate, and the like; naphthol derivatives such as 2-benzyloxynaphthalene, and the like; biphenyl derivatives such as acetylbiphenyl, p-benzylbiphenyl, 4-allyloxybiphenyl, and the like; polyester coupounds such as 1,2-bis(3-methylphenoxy)ethane, 2,2'-bis(4-methoxyphenoxy)diethyl ether, bis(4-methoxyphenyl) ether, and the like; carbonic acid or oxalic acid diester derivatives such as diphenyl carbonate, dibenzyl oxalate, oxalic acid di(p-chlorobenzyl) ester, oxalic acid di(p-methylbenzyl) ester, and and the like. Among those, dibenzyl oxalate derivatives are effective for keeping the solid plasticizer in liquid state.

Various thermal-response retarders can be used in mixturing fine particles of the heat-fusible substance. The thermal-response retarders are generally classified into two types; one is the substrates that do not fuse by heating, and the other is those that fuse by heating. The thermal-response retarders that do not fuse by heating are selected from vinyl monomers such as styrene derivatives, acrylic acid derivatives, methacrylic acid derivatives, acrylamide derivatives, crotonic acid derivatives, and the like. Those can be used either alone or in combination. Specific examples of the vinyl monomers are methacrylic acid, methyl methacrylate, ethyl methacrylate, n-butyl methacrylate, t-butyl methacrylate, 2-ethylhexyl methacrylate, lauryl methacrylate, dodecyl methacrylate, cyclohexyl methacrylate, benzyl methacrylate, glycidyl methacrylate, 2-hydroxyethyl methacrylate, 2-hydroxypropyl methacrylate, methyl chloride salt of dimethylaminoethyl methacrylate, tetrahydrofurfuryl methacrylate, isobornyl methacrylate, phenyl methacrylate, 2-succinoyloxyethyl methacrylate, 2-hexahydrophthaloyloxyethyl methacrylate, acrylic acid, 2-hydroxyethyl acrylate, 2-hydroxypropyl acrylate, isobutyl acrylate, t-butyl acrylate, stearyl acrylate, tetrahydrofurfuryl acrylate, carbitol acrylate, benzyl acrylate, N,N-dimethylacrylamide, acryloylmorpholine, N-isopropylacrylamide, styrene, methylstyrenes, ethylstyrenes, p-octadecylstyrene, chlorostyrenes, p-methoxystyrene, p-vinylbenzyl propyl ether, methyl p-vinylbenzoate, crotonic acid, n-octyl crotonate, vinyl acetate, maleic anhydride, vinyl chloride, ethylene, acrylonitrile, t-butyl acrylamide, n-octyl methacrylamide and the like. In addition to the copolymers of these vinyl monomers mentioned above, other thermoplastic resins such as styrene-butadiene rubber (SBR), acrylonitrile-butadiene rubber (NBR), polyurethanes polyureas, and the like can be used The thermal-response retarders that fuse by heating are suitably selected from various kinds of wax. The specific examples include wax such as animal- or vegetable-origin wax, synthetic wax, and the like; as well as higher fatty acids, higher fatty acid amides, higher fatty acid anilides, acetylated products of aromatic amines, paraffin wax, Japan wax (sumac wax), carnauba wax, shellac, montan wax, oxidized paraffin, polyethylene wax, oxidized polyethylene, and the like. Examples of the higher fatty acids include stearate amide, ole amide, N-methyl stearate amide, erucamide, methylol behenamide, methylol stearate amide, methylene bis stearate amide, ethylene bis stearate amide, and the like. Examples of the higher fatty acid anilides include stearic acid anilide and linolic acid anilide and the like. Examples of the acetylated products of aromatic amines include aromatic amines, acetotoluidide and the like. In addition to wax, the retarders can be selected from leuco dyes, developers and the like generally used in thermal recording materials.

Thermoplastic resins used for the heat-sensitive adhesive materials of the present invention include (meta)acrylic ester copolymers, styrene-isoprene copolymers, styrene-acrylic ester copolymers, styrene-butadiene copolymers, acrylonitrile-butadiene copolymers, ethylene-vinyl acetate copolymers, vinyl acetate-acrylic ester copolymers, ethylene-vinyl chloride copolymers, ethylene-acrylic ester copolymers, vinyl acetate-ethylene-vinyl chloride copolymers, vinyl acetate-ethylene-acrylic ester copolymers, vinyl acetate-ethylene-styrene copolymers, polybutadienes, polyurethanes, acrylic acid 2-ethylhexyl, acryl-nitrile, methyl methacrylate and the like. The examples are not restricted to the above-mentioned. Each of these resins can be used in combination.

Solid plasticizers used for the heat-sensitive adhesive materials of the present invention include the following compounds. The examples are not limited to those described below.

TABLE 1 compound 1
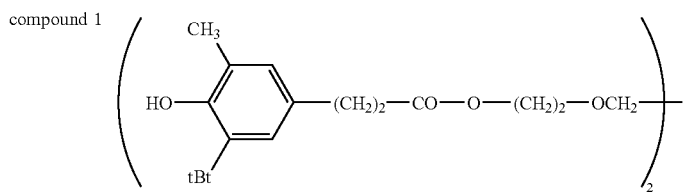

compound 2
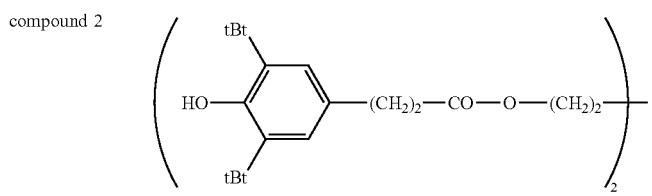

TABLE 1-continued
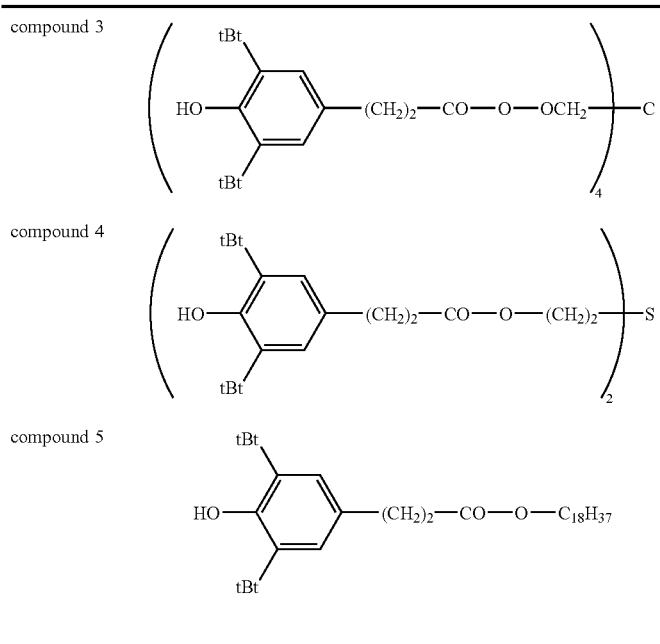
TABLE 2
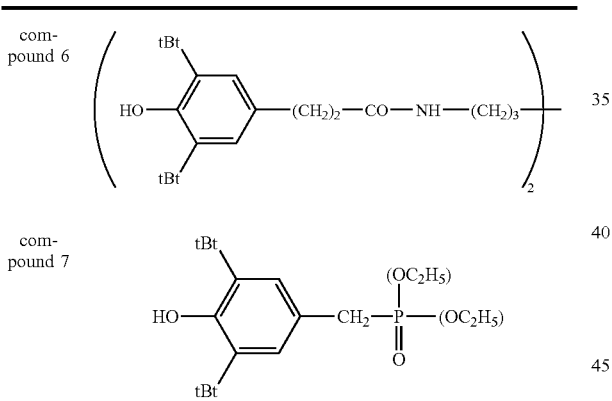
TABLE 3
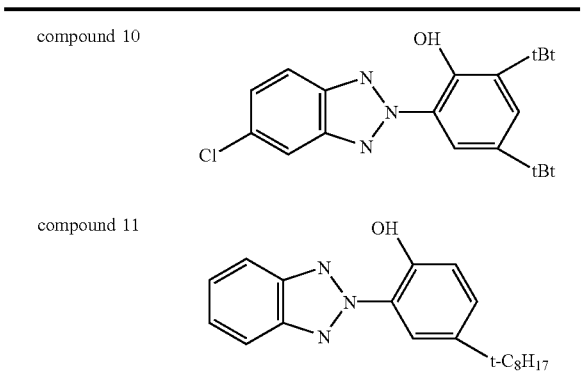
TABLE 3-continued
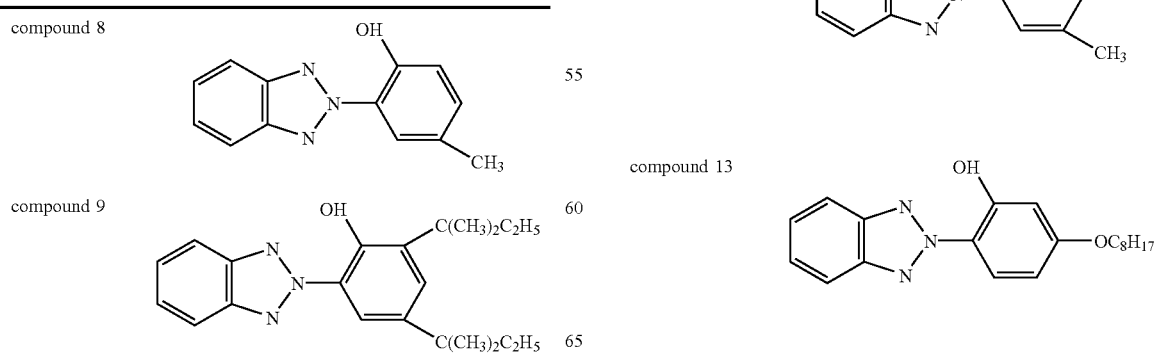

TABLE 4
| | |
|---|---|
| compound 14 | 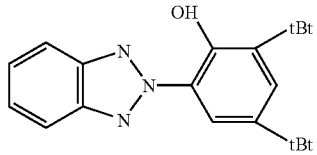 |
| compound 15 | 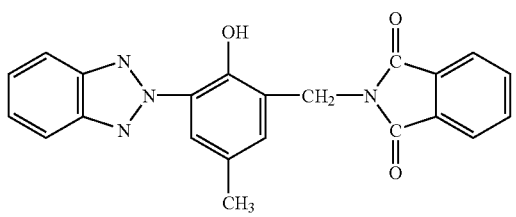 |
| compound 16 | 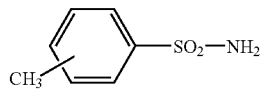 |
| compound 17 | 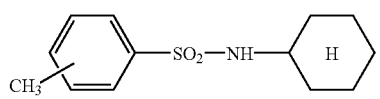 |
| compound 18 | 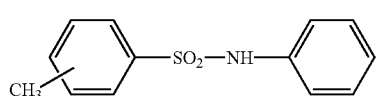 |
| compound 19 | 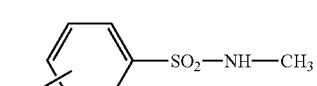 |
| compound 20 | 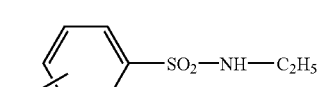 |
| compound 21 | 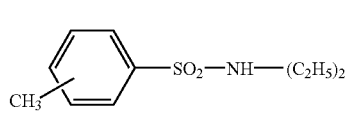 |
TABLE 5
| | |
|---|---|
| compound 22 | 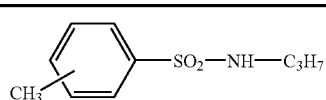 |
| compound 23 | 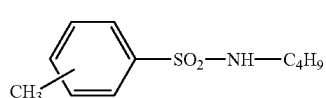 |
| compound 24 | 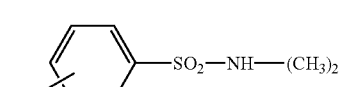 |
| compound 25 | 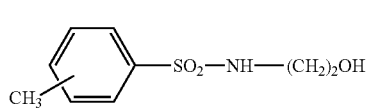 |
| compound 26 | 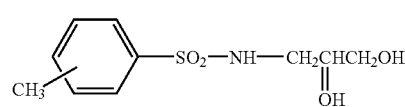 |
| compound 27 | 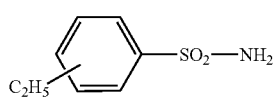 |
| compound 28 | 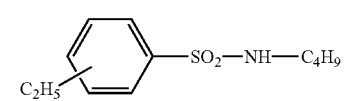 |

TABLE 5-continued

| compound 29 | 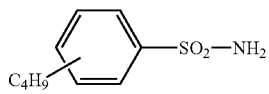 |

TABLE 6

| compound 30 | 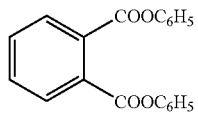 |
| compound 31 | 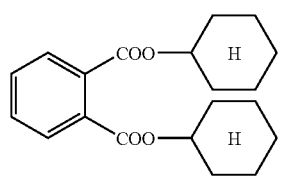 |
| compound 32 | 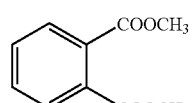 |
| compound 33 | 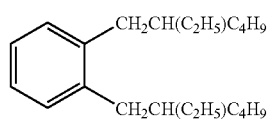 |
| compound 34 | 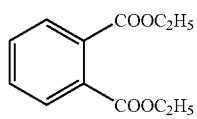 |
| compound 35 | 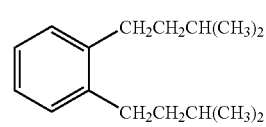 |
| compound 36 | 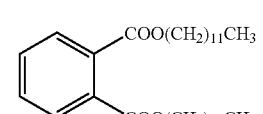 |
| compound 37 | 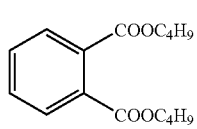 |

Among the above-mentioned thermoplastic resins and solid plasticizers, the present inventors found that using poly(2-ethylhexyl acrylate) as the thermoplastic resin and one of the compounds (a), (b) and (c) expressed by the following Chemical formula (A) as the solid plasticizer in combination is particularly effective to improve adhesion properties and anti-blocking properties against polyolefin wrap.

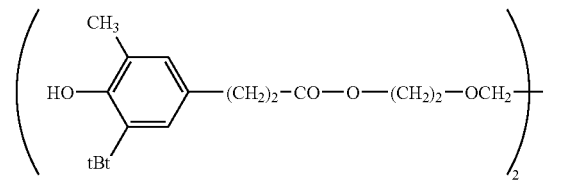

compound (a)

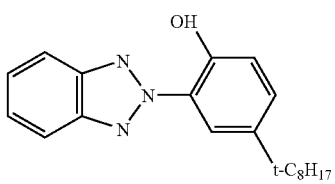

compound (b)

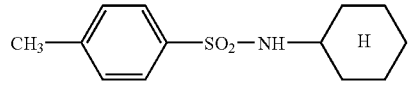

compound (c)

In the Chemical Formula (A), tBt expresses tertiary butyl.

The heat-sensitive adhesive layer according to the present invention may further comprise a tackifier to improve adhesion. Such tackifiers used in the present invention include terpene resins, aliphatic petroleum resins, aromatic petroleum resins, chroman-indene resins, styrenic resins, phenolic resins, terpenephenol resins, rosin derivative resins, and the like. The tackifiers are not restricted to the above-mentioned. The amount of the tackifier is 200 parts or less and preferably 20 to 150 parts relative to 100 parts of the 200 parts, the resulting heat-sensitive adhesive material is likely to cause blocking.

The heat-sensitive adhesive layer according to the present invention may further comprise a hydrophilic or water-soluble polymer binder in order to improve adhesion between the heat-sensitive adhesive layer and the substrate, or to increase cohesion in the heat-sensitive adhesive layer. The examples of hydrophilic polymer binders include cellulose derivatives such as poly(vinyl alcohol), poly(vinyl acetate), oxidized starch, etherized starch, carboxymethylcellulose, hydroxyethylcellulose, and the like; as well as casein, gelatins, sodium alginate and the like. The content of the hydrophilic polymer binder is, for instance, 30% by weight or less, and preferably 10% by weight or less relative to the total solid contents of the heat-sensitive adhesive layer, so as not to deteriorate adhesive of the heat-sensitive adhesive material does not deteriorate.

The heat-sensitive adhesive layer according to the present invention may further comprise various additives, in addition to the aforementioned components, if necessary. Such additives include hardening agents, antiseptics, dyes, developers, intensifiers, UV absorbents, antioxidants, pH adjusters, defoaming agents and the like.

Adding an anti-blocking agent into the heat-sensitive adhesive layer according to the present invention and/or an adjacent layer to the heat-sensitive adhesive layer allows for improvement of blocking at high temperature and high humidity. Such antiblocking agents include, for example, wax, inorganic fillers, and the like. The examples include wax such as animal- or vegetable-origin wax, synthetic wax, and the like; as well as higher fatty acids, higher fatty acid amides, higher fatty acid anilides, acetylated products of aromatic amines, paraffin wax, Japan wax (sumac wax), carnauba wax, shellac, montan wax, oxidized paraffin, polyethylene wax, oxidized polyethylene and the like. The examples of higher fatty acids include stearic acid, behenic acid and the like. The examples of higher fatty acid amides include stearate amide, oleamide, N-methyl stearate amide, erucamide, methylol behenamide, methylol stearate amide, methylene bis(stearate amide), and ethylene bis(stearate amide) and the like. The examples of higher fatty acid anilides include stearic acid anilide, linolic acid anilide, and the like. The examples of the acetylated products of aromatic amines include acetotoluidide and the like.

Such antiblocking agents include, for example, wax and inorganic fillers. Such wax include, but are not limited to, animal-or vegetable-origin wax, synthetic wax, and the like and other wax; as well as higher fatty acids, higher fatty acid amides, higher fatty acid anilides, acetylated products of aromatic amines, paraffin wax, Japan wax (sumac wax), carnauba wax, shellac, montan wax, oxidized paraffin, polyethylene wax, oxidized polyethylene and the like. The higher fatty acids include, for example, stearic acid, behenic acid and the like. The higher fatty acid amides include, for example, stearate amide, oleamide, N-methyl stearate amide, erucamide, methylol behenamide, methylol stearate amide, methylene bis(stearate amide), and ethylene bis (stearate amide) and the like. The higher fatty acid anilides include, for example, stearic acid anilide and linolic acid anilide. The acetylated products of aromatic amines include, for example, acetotoluidide and the like. In addition, those generally used in thermal recording materials such as leuco dyes, developers and the like can also be used. The wax and other heat-fusible substances preferably have as high melting points as possible in order not to affect the adhesive strength of the resulting heat-sensitive adhesive material. The examples of the inorganic fillers include carbonates such as aluminium, zinc, calcium, magnesium, barium, titanium, and the like, oxides, hydroxides, sulfates and the like; as well as inorganic pigments including clay such as natural silica, zeolite, kaolin, calcined kaolin, and the like. These inorganic fillers have as low oil absorption as possible so as not to affect the adhesive strength of the heat-sensitive adhesive layer.

In addition, the present inventors have also found that satisfying the following Formula (B) is effective in order to activate and achieve high performance of adhesion under a wide range of temperature:

(B) $E_3 < E_4$ wherein $E_3$ is energy to exhibit the maximum adhesive strength when one of the adherend temperature and the ambient temperature is $T_1$; and $E_4$ is energy to exhibit the maximum adhesive strength when one of the adherend temperature and the ambient temperature is $T_2$ lower than $T_1$.

According to the method for activating (or to activate adhesive property) the heat-sensitive adhesive material, when the high temperature adherend and/or the ambient temperature is as high as $T_1$, lower energy $E_3$ is applied to activate except for fine particles consisting of the heat-fusible substance and resin, both of which decrease the freezing point of solid plasticizer in the heat-sensitive adhesive layer. It allows for high performance in adhesion according to the high temperature adherend and/or the ambient temperature. On the other hand, when the low temperature adherend and/or the ambient temperature is as low as $T_2$, higher energy $E_4$ is applied to activate fine particles consisting of the heat-fusible substance and resin as well, both of which decrease the freezing point of solid plasticizer in the heat-sensitive adhesive layer. It allows for high performance in adhesion according to the low temperature adherend and/or the ambient temperature.

Figure 1B:
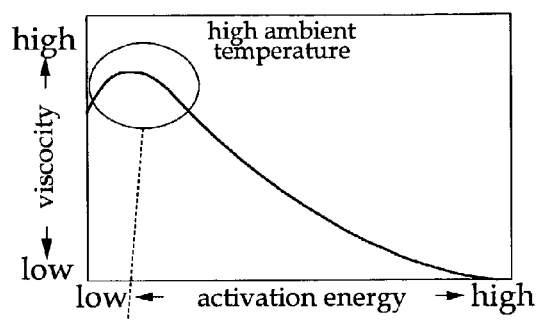
Figure 1C:
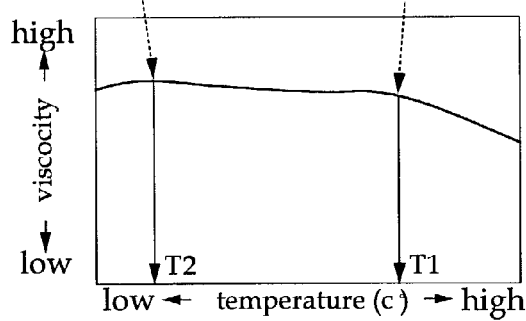

FIGS. 1A, 1B and 1C show the relation between the applied energy and the resulting adhesive strength when the heat-sensitive adhesive material is activated.

Specifically, FIG. 1A shows the relation between the activation energy and the adhesive strength when the activation energy is applied at a low ambient temperature. FIG. 1B shows the relation between the activation energy and the adhesive strength when the activation energy is applied at a high ambient temperature. FIG. 1C shows the relation between the temperature and the adhesive strength obtained based on the results in FIGS. 1A and 1B.

By applying activation energy corresponding to the ambient temperature and/or the adherend temperature, the heat-sensitive adhesive material can more efficiently show high adhesion from low to high temperatures.

Here, the heat energy refers to a static activation energy or to a dynamic activation energy which may be controlled by controlling the temperature of the heat roll or by controlling energy of the thermal head.

In the heat sensitive adhesive material of the present invention, various benefits can be obtained by introducing a thermal recording layer mainly comprising a leuco dye and a developer on an opposite side of the adhesive layer. For instance, it is possible to activate adhesion as well as to perform heat-sensitive color development at the same time, by applying heat from both the heat-sensitive chromogenic layer and the heat-sensitive adhesive layer. Such leuco dyes and developers for thermal recording in the thermal recording layer for the present invention are not specifically limited as long as they are generally used in thermal recording paper.

The examples of basic leuco dyes include fluoran compounds, triarylmethane compounds, spirocompounds, diphenylmethane compounds, thiazine compounds, lactam compounds, fluorene compounds and the like. The compounds whose absorptive spectrums have at least one or more maximum absorption wavelengths in the range of 550 nm to 1000 nm are more preffered.

The examples of fluoran compounds include 3-diethylamino-6-methyl-7-anilinofluoran, 3-dibutylamino-6-methyl-7-anilinofluoran, 3-(N-methyl-N-cyclohexylamino)-6-methyl-7-anilinofluoran, 3-(N-ethyl-N-isopentylamino)-6-methyl-7-anilinofluoran, 3-(N-isobutyl-N-ethylamino)-6-methyl-7-anilinofluoran, 3-[N-ethyl-N-(3-ethoxypropyl)amino]-6-methyl-7-anilinofluoran, 3-(N-ethyl-N-hexylamino)-6-methyl-7-anilinofluoran, 3-dipentylamino-6-methyl-7-anilinofluoran, 3-(N-methyl-N-propylamino)-6-methyl-7-anilinofluoran, 3-(N-ethyl-N-tetrahydrofurylamino)-6-methyl-7-anilinofluoran, 3-diethylamino-6-methyl-7-(p-chloroanilino)fluoran, 3-diethylamino-6-methyl-7-(p-fluoroanilino)fluoran, 3-(p-toluidinoethylamino)-6-methyl-7-anilinofluoran, 3-diethylamino-6-methyl-7-(p-toluidino)fluoran, 3-diethylamino-7-(3,4-dichloroanilino)fluoran, 3-pyrrolidino-6-methyl-7-anilinofluoran, 3-diethylamino-6-chloro-7-ethoxyethylaminofluoran, 3-diethylamino-6-chloro-7-anilinofluoran, 3-diethylamino-7-phenylfluoran, 3-(p-toluidinoethylamino)-6-methyl-7-phenethylfluoran and the like.

The examples of triarylmethane compounds include 3,3-bis(p-dimethylaminophenyl)-6-dimethylaminophthalide (i.e., crystal violet lactone (CVL)), 3,3-bis(p-dimethylaminophenyl)phthalide, 3-(p-dimethylaminophenyl)-3-(1,2-dimethylaminoindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-5-dimethylaminophthalide, 3,3-bis(2-phenylindol-3-yl)-5-dimethylaminophthalide, and 3-p-dimethylaminophenyl-3-(1-methylpyrrol-2-yl)-6-dimethylaminop hthalide, and the like.

The examples of spirocompounds include 3-methylspirobi(naphthopyran), 3-ethylspirobi(naphthopyran), 3,3'-dichlorospirobi(naphthopyran), 3-benzylspirobi(naphthopyran), 3-propylspirobenzopyran, 3-methylnaphtho-(3-methoxybenzo)spiropyran, 1,3,3-trimethyl-6-nitro-8'-methoxyspiro(indoline-2,2'-benzopyran), and the like. The examples of diphenylmethane compounds include N-halophenyl-leucoauramines, 4,4-bis(dimethylaminophenyl)benzhydryl benzyl ether, N-2,4,5-trichlorophenylleucoauramine, and the like. The examples of thiazine compounds include benzoyl Leucomethylene Blue p-nitrobenzoyl Leucomethylene Blue, and the like. The examples of lactam compounds include Rhodamine B anilinolactam, Rhodamine B p-chloroanilinolactam, and the like. The examples of fluorene compounds include 3,6-bis(dimethylamino)fluorene-spiro(9,3')-6'-dimethylaminophthalide, 3,6-bis(dimethylamino)fluorenespiro(9,3')-6'-pyrrolidinophthalide, 3-dimethylamino-6-diethylamino-fluorene-spiro (9,3')-6'-pyrrolidinoph thalide, and the like.

In addition, the examples of color-developable basic leuco dyes include 3-diethylamino-6-methyl-7-chlorofluoran, 3-cyclohexylamino-6-chlorofluoran, 3-diethylamino-benzo[α]fluoran, 3-dibutylamino-benzo[α]fluoran, 3-diethylamino-7-chlorofluoran, 3-diethylamino-7-methylfluoran, 3-N-ethyl-N-isoamyl-benzo[α]fluoran, 3-N-ethyl-N-p-methylphenylamino-7-methylfluoran, 3-diethylamino-6,8-dimethylfluoran, 3-dibutylamino-6-methyl-7-bromofluoran, 3,6-bis(diethylaminofluoran)-γ-(4'-nitro)anilinolactam, bis(1-n-butyl-2-methylindol-3-yl)phthalide, bis (1-ethyl-2-methylindol-3-yl)phthalide, 3-(4-diethylaminophenyl)-3-(1-ethyl-2-methylindol-3-yl) phthalide, 3-(4-diethylamino-2-ethoxyphenyl)-3-(1-ethyl-2-methylindol-3-yl)-4-az aphthalide, 3-(4-diethylaminophenyl)-3-(1-ethyl-2-methylindol-3-yl) phthalide, 3-(4-diethylamino-2-methylphenyl)-3-(1-ethyl-2-methylindol-3-yl)phth alide, 3,3-bis(4-dimethylaminophenyl)-6-diethylaminophthalide, 3,7-bis(4-dimethylamino)-10-benzoylphenothiazine, 3,3-bis(4-diethylamino-6-ethoxyphenyl)-4-azaphthalide, 3-diethylamino-7-dianilinofluoran, 3-N-ethyl-N-4-methylphenylamino-7-N-methylanilinofluoran, 3-diethylamino-7-N-dibenzylaminofluoran, 3,6-dimethoxyfluoran, 3,6-dibutoxyfluoran, 2',4'-dioctyloxyphenyl-2-styrylquinoline, and the like.

The specific examples of developers for the present invention include those generally used for pressure-sensitive or thermal recording paper, such as bis(3-allyl-4-hydroxyphenyl)sulfone, α-naphthol, β-naphthol, p-octylphenol, 4-t-octylphenol, p-t-butylphenol, p-phenylphenol, 1,1-bis(p-hydroxyphenyl)propane, 2,2-bis(p-hydroxyphenyl)propane (i.e., bisphenol A or BPA), 2,2-bis(p-hydroxyphenyl)butane, 1,1-bis(p-hydroxyphenyl)cyclohexane, 4,4'-thiobisphenol, 4,4'-cyclohexylidenediphenol, 2,2'-(2,5-dibromo-4-hydroxyphenyl)propane, 4,4-isopropylidenebis(2-t-butylphenol), 2,2'-methylenebis(4-chlorophenol), 4,4'-dihydroxydiphenyl sulfone, 4-hydroxy-4'-methoxydiphenyl sulfone, 4-hydroxy-4'-ethoxydiphenyl sulfone, 4-hydroxy-4-isopropoxydiphenyl sulfone, 4-hydroxy-4'-buroxydiphenyl sulfone, methyl bis(4-hydroxyphenyl)acetate, butyl bis(4-hydroxyphenyl) acetate, benzyl bis(4-hydroxyphenyl)acetate, 2,4-dihydroxy-2'-methoxybenzanilide, and the like; aromatic carboxylic acid derivatives such as benzyl p-hydroxybenzoate, ethyl p-hydroxybenzoate, dibenzyl 4-hydroxyphthalate, dimethyl 4-hydroxyphthalate, ethyl 5-hydroxyisophthalate, 3,5-di-t-butylsalicylic acid, 3,5-di-α-methylbenzylsalicylic acid, and the like; aromatic carboxylic acids, metal salts of the aromatic acarboxylic acids, and the like.

The examples of binders used for the thermal recording layer include cellulose derivatives such as starches, hydroxyethylcellulose, methylcellulose, ethylcellulose, carboxymethylcellulose, and the like; proteins such as casein, gelatin, and the like; hydrophilic or water-soluble natural high-molecular compounds like saccharose including oxidized starch, esterified starch and the like; hydrophilic or water-soluble natural high-molecular compounds like poly (vinyl alcohol), modified poly(vinyl alcohol), poly(vinylpyrrolidone), poly(acrylic acid), poly(sodium acrylate), acrylamide-acrylic ester copolymers, acrylamide-ester acrylate-methacrylic acid terpolymers, alkali salts of styrene-maleic anhydride copolymers, latices, polyacrylamides, styrene-maleic anhydride copolymers, and the like; water-soluble adhesive resins such as latices, alkali salts of ethylene-maleic anhydride copolymers, and the like; and latices such as poly(vinyl acetate), polyurethanes, poly(acrylic ester), styrene-butadiene copolymers, acrylonitrile-butadiene copolymers, methyl acrylate-butadiene copolymers, acrylonitrile-butadiene-acrylic acid copolymers, ethylene-vinyl acetate copolymers, and the like.

The thermal recording layer may further comprise sensitizers (intensifiers) to improve the sensitivity. The examples of sensitizers include wax such as N-hydroxymethylstearamide, stearamide, palmitamide, and the like; naphthol derivatives such as 2-benzyloxynaphthalene and the like; biphenyl derivatives such as acetylbiphenyl, p-benzylbiphenyl, 4-allyloxybiphenyl, and the like; polyether compounds such as 1,2-bis(3-methylphenoxy)ethane, 2,2'-bis(4-methoxyphenoxy) diethyl ether, bis(4-methoxyphenyl) ether, and the like; carbonic acid or oxalic acid diester derivatives such as diphenyl carbonate, dibenzyl oxalate, di(p-chlorobenzyl) oxalate, and th like.

The examples of pigments used for the thermal recording layer include diatomaceous earth, talc, kaolin, calcined kaolin, calcium carbonate, magnesium carbonate, titanium oxide, zinc oxide, silicon oxide, aluminium hydroxide, urea-formaldehyde resins, and the like.

An underlying layer containing an airspace between the heat-sensitive adhesive layer and the substrate enables heat energy supplied from a thermal head to be highly efficiently utilized. This results in sufficient adhesive strength with low energy. When the heat-sensitive adhesive material carries a heat-sensitive chromogenic layer on its surface, if the heat-sensitive adhesive layer is heated at high temperatures, the heat reaches the the heat-sensitive chromogenic layer, hence it is likely to cause quality defects such as bleeding and the like. The ratio of the airspace may be expressed by: (a volume of the air space of a single particle)/(volume for the entire single particle)×100. With the underlying layer containing an airspace between the heat-sensitive adhesive layer and the substrate, it is possible to block the heat and to prevent the heat from transmitting and diffusing to the heat-sensitive chromogenic layer. Therefore, it is possible to prevent bleeding. The underlying layer containing airspace may also be placed between the heat-sensitive chromogenic layer and the substrate. The higher the air ratio (the ratio of the air to the underlying layer) is, the more beneficially the adhesive and heat-blocking properties improve. There are various methods for containing air into the underlying layer. One of the general examples is an underlying layer utilizing hollow particles, which are made of high-molecular compounds such as acrylic polymers, vinyl chloride polymers, and the like. Introducing an underlying layer that mainly consists of one or more of thermoplastic resins, thermoplastic resins impregnated with liquid plasticizers, solid plasticizers, agents for enhancing supercooling, and liquid plasticizer-encapsulated microcapsules, contributes to maintaining a softening state of the thermoplastic resisns, and improving adhesive strength under a low temperature ambience.

The methods for activating the heat-sensitive adhesive material of the present invention include hot-air activation, hot-roll activation, thermal head activation and the like. Among them, the thermal head activation is preferred as modulation energy means to satisfy the Formula (B).

Base paper preferably used as the substrate according to the present invention mainly comprises wood pulp and a filler.

The examples of wood pulp include chemical pulps such as latifoliate tree bleached kraft pulp (LBKP), needle-leafs tree bleached kraft pulp (NBKP), and the like; mechanical pulps such as groundwood pulp (GP), pressurized groundwood pulp (PGW), refiner mechanical pulp (RMP), thermomechanical pulp (TMP), chemithermomechanical pulp (CTMP), chemimechanical pulp (CMP), chemigroundwood pulp (CGP), and the like; and wastepaper pulps such as deinked pulp (DIP), and the like. The base paper may further comprise known pigments, binders, as well as addives such as sizing agents, fixing agents, yield improvers, cationizing agents, paper strength additives, and the like, one or more of which may be mixed and can produce a base material with a device such as a wire paper machine, cylinder paper machine, twin wire paper machine, and the like. The produced base papar may be made in the state of either acid, alkali, or neutral. The base paper can also be made by carrying out on-machine treatment on a calendering machine comprising a metallic roll and a synthetic resin roll. It is also possible to implement off-machine treatment. It is still possible to implement calender treatment after off-machine treatment, with machine-calendering, supercalendering and and the like, so as to control the flatness.

The examples of fillers used in the base paper include white inorganic pigments such as precipitate calcium carbonate light, calcium carbonate heavy, kaolin, talc, calcium sulfate, barium sulfate, titanium dioxide, zinc oxide, zinc sulfide, satin white, aluminium silicate, diatomaceous earth, calcium silicate, magnesium silicate, synthetic silica, aluminium hydroxide, alumina, lithopone, zeolite, magnesium carbonate, magnesium hydroxide, and the like; and organic pigments such as styrenic plastic pigments, acrylic plastic pigments, polyethylenes, microcapsules, urea resins, melamine resins, a and the like.

The examples of methods for coating to introduce a thermal recording layer, an intermediate layer and a protective layer include any known coating methods such as blade coating, gravure coating, gravure-offset coating, bar coating, roll coating, knife coating, air knife coating, comma coating, U comma coating, AKKU coating, smoothing coating, microgravure coating, reverse roll coating, four- or five-roll coating, dip coating, drop curtain coating, slide coating, die coating, and and the like.

EXAMPLES

The present invention will be illustrated in further detail with reference to several examples and comparative examples below, all of which are not intended to limit the scope of the present invention. All parts and percentages are by weight. All coat weights are coat weights after drying unless otherwise specified.

Example 1

(1) Preparation of Solid Plasticizer Dispersion [A]

To 20 parts of water were added 10 parts of Compound 30 (melting point: 73° C.) as a solid plasticizer and 20 parts of 10% poly(vinyl alcohol) aqueous solution as a dispersing agent, the resulting mixture was homogeneously blended, was pulverized in a ball mill to an average particle diameter of 1.0 µm and thereby yielded a solid plasticizer dispersion [A].

(2) Preparation of Heat-sensitive Adhesive Coating Composition [B]

A total of 7 parts of a styrene-acrylic resin emulsion (Tg: −10° C.; average molecular weight: 450000; solid content: 50%) as a thermoplastic resin, 20 parts of the solid plasticizer dispersion [A], 3 parts of terpene-phenol emulsion (solid content: 50%) as a tackifier, and 12 parts of a composite particle emulsion of methyl stearate (melting point: 40° C.) and acrylonitrile-styrene resin were sufficiently blended by agitation and thereby yielded a heat-sensitive adhesive coating composition [B]. The composite particle emulsion used herein comprised 60 parts of methyl stearate and 40 parts of the acrylonitrile-styrene resin, had an average particle diameter of 80 µm, a specific gravity as a composite particle of 1.0 and a solid content of 30%.

(3) Preparation of Heat-sensitive Adhesive Material

The heat-sensitive adhesive coating composition [B] was applied to one side of a substrate using a wire bar to an amount of the thermoplastic resin of 3.0 g/m$^2$, was dried and thereby yielded a heat-sensitive adhesive material of the present invention.

Example 2

A heat-sensitive adhesive material of the present invention was prepared in the same manner as in Example 1, except that the composite particle emulsion of methyl stearate and the acrylonitrile-styrene resin used herein had an average particle diameter of 10 µm.

Example 3

A heat-sensitive adhesive material of the present invention was prepared in the same manner as in Example 2, except that the composite particle emulsion of methyl stearate and a acrylonitrile-styrene resin used herein comprised 20 parts of methyl stearate and 80 parts of the acrylonitrile-styrene resin.

Example 4

A heat-sensitive adhesive material of the present invention was prepared in the same manner as in Example 3, except that a composite particle of acetylbiphenyl (melting point: 120° C.) and a acrylonitrile-styrene resin was used instead of the composite particle emulsion of methyl stearate and acrylonitrile-styrene resin.

Example 5

A heat-sensitive adhesive material of the present invention was prepared in the same manner as in Example 3, except that a composite particle of di(p-methylbenzyl) oxalate (melting point: 100° C.) and an acrylonitrile-styrene resin was used instead of the composite particle of methyl stearate and acrylonitrile-styrene resin.

Example 6

A heat-sensitive adhesive material of the present invention was prepared in the same manner as in Example 3, except that a composite particle of dibenzyl oxalate (melting point: 80° C.) and an acrylonitrile-styrene resin was used instead of the composite particle of methyl stearate and acrylonitrile-styrene resin.

Example 7

A heat-sensitive adhesive material of the present invention was prepared in the same manner as in Example 6, except that the specific gravity of the composite particle of dibenzyl oxalate and the acrylonitrile-styrene resin was changed from 1.0 to 0.65.

Example 8

A heat-sensitive adhesive material of the present invention was prepared in the same manner as in Example 6, except that a resin emulsion of poly(2-ethylhexyl acrylate) (Tg: −60° C.; average molecular weight: 450000; solid content: 50%) was used instead of the styrene-acrylic resin emulsion (Tg: −10° C.; average molecular weight: 450000; solid content: 50%) as the thermoplastic resin, and that Compound 1 (melting point: 77° C.) was used as the solid plasticizer instead of Compound 30 (melting point: 73° C.).

Comparative Example 1

(1) Preparation of Solidifying Point Depressing Agent Dispersion [C]

To 10 parts of methyl stearate as a solidifying point depressing agent for solid plasticizer were added and mixed homogeneously 10 parts of 10% poly(vinyl alcohol) aqueous solution as a dispersing agent and 20 parts of water, the resulting mixture was pulverized in a ball mill to an average particle diameter of 1.0 µm and thereby yielded a solidifying point depressing agent dispersion [C].

(2) Preparation of Heat-sensitive Adhesive Coating Composition [D]

A total of 7 parts of a styrene-acrylic resin emulsion (Tg: −10° C.; average molecular weight: 450000; solid content: 50%) as a thermoplastic resin, 20 parts of the solid plasticizer dispersion [A], 3 parts of terpene-phenol emulsion (solid content: 50%) as a tackifier, and 8 parts of the solidifying point depressing agent dispersion [C] were mixed thoroughly and thereby yielded a heat-sensitive adhesive coating composition [D].

(3) Preparation of Heat-sensitive Adhesive Material

The heat-sensitive adhesive coating composition [D] was applied to one side of a substrate using a wire bar to an amount of the thermoplastic resin of 3.0 g/m², was dried and thereby yielded a heat-sensitive adhesive material as a comparative example.

Comparative Example 2

A heat-sensitive adhesive material as another comparative example was prepared in the same manner as in Comparative Example 1, except that dibenzyl oxalate was used instead of methyl stearate.

The adhesion of the heat-sensitive adhesive materials prepared according to the examples and comparative examples was determined according to the following test methods, and the results are shown in Table 7 below.

(a) Adhesion (Tackiness) at 5° C. at 15% RH

A sample heat-sensitive adhesive material was cut to a rectangular piece 4.0 cm wide and 9.0 cm long, and the heat-sensitive adhesive layer was activated by heating using a thermal printer (available from Okura Electric Co., Ltd., under the trade name of TH-PMD) at energy applied to thermal head of 0.54 mJ/dot, a printing speed of 4 ms/line, and a platen pressure of 6 kgf/line. The activated heat-sensitive adhesive material was applied to each of adherends [polyolefin (PO) wrap and poly(vinyl chloride) (PVC) wrap] in a longitudinal direction using a rubber roller under a load of 2 kg and was peeled off at a peel angle of 180° and a peel rate of 300 mm/min, one minute later. The resistance in this procedure was indicated as the adhesive strength by the gf/40-mm.

(b) Adhesion at 30° C. at 65% RH

A sample heat-sensitive adhesive material was cut to a rectangular piece 4.0 cm wide and 9.0 cm long, and the heat-sensitive adhesive layer was activated by heating using a thermal printer (available from Okura Electric Co., Ltd., under the trade name of TH-PMD) at energy applied to thermal head of 0.23 mJ/dot, a printing speed of 4 ms/line, and a platen pressure of 6 kgf/line. The activated heat-sensitive adhesive material was applied to each of adherends [polyolefin (PO) wrap and poly(vinyl chloride) (PVC) wrap] in a longitudinal direction using a rubber roller under a load of 2 kg and was peeled off at a peel angle of 180° and a peel rate of 300 mm/min, one minute later. The resistance in this procedure was indicated as the adhesive strength by the gf/40-mm.

TABLE 7

| | Adhesion to PO wrap (gf / 40-mm) | | Adhesion to PVC wrap (gf / 40-mm) | |
|---|---|---|---|---|
| | 5° C. / 15% | 30° C. / 65% | 5° C. / 15% | 30° C. / 65% |
| Example 1 | 2280 | 1864 | 2419 | 2049 |
| Example 2 | 2410 | 1763 | 2502 | 2255 |
| Example 3 | 2348 | 2399 | 2377 | 2412 |
| Example 4 | 2544 | 2453 | 2698 | 2756 |
| Example 5 | 2811 | 2395 | 3011 | 2652 |
| Example 6 | 3012 | 2412 | 3222 | 2690 |
| Example 7 | 3166 | 2397 | 3249 | 2543 |
| Example 8 | 3365 | 2548 | 3465 | 2877 |
| Comp. Ex. 1 | 2348 | 413 | 2428 | 528 |
| Comp. Ex. 2 | 3120 | 23 | 3211 | 123 |

Example 9

(1) Preparation of Dye Dispersion [E]

A mixture of 1.0 part of 3-dibutylamino-6-methyl-7-anilinofluoran, 1.0 part of 10% poly(vinyl alcohol) aqueous solution and 2.0 parts of water was pulverized and dispersed using a sand grinder to an average particle diameter of 1.0 µm and thereby yielded a dye dispersion [E].

(2) Preparation of Developer Dispersion [F]

A mixture of 3.0 parts of 4-hydroxy-4'-isopropoxydiphenyl sulfone, 1.0 part of silica, 40 parts of 10% poly(vinyl alcohol) aqueous solution and 10.0 parts of water was pulverized and dispersed using a sand grinder to an average particle diameter of 3 μm or less and thereby yielded a developer dispersion [F].

(3) Preparation of Heat-sensitive Chromogenic Composition [G]

A mixture of 4.0 parts of the dye dispersion [E], 18.0 parts of the developer dispersion [F] and 3.0 parts of water was mixed thoroughly and thereby yielded a heat-sensitive chromogenic composition [G].

(4) Preparation of Silica Dispersion [H]

A mixture of 1.0 part of silica, 1.0 part of 10% poly(vinyl alcohol) aqueous solution, and 2.0 parts of water was pulverized and dispersed using a sand grinder to an average particle diameter of 3.0 μm or less and thereby yielded a silica dispersion [H].

(5) Preparation of Protective Composition [I]

A mixture of 4.0 parts of the silica dispersion [H], 10.0 parts of 10% poly(vinyl alcohol) aqueous solution, 1.0 part of 30% zinc stearate dispersion (available from Chukyo Yushi Co., Ltd., under the trade name of Z-730), 3.2 parts of 12.5% polyamide-epichlorohydrin solution and 5.8 parts of water was stirred sufficiently and thereby yielded a protective composition [I].

(6) Preparation of Heat-sensitive Adhesive Material

A heat-sensitive adhesive material of the present invention was prepared by the following procedures. Specifically, to an opposite side to the heat-sensitive adhesive layer of the heat-sensitive adhesive material obtained in Example 6, the heat-sensitive chromogenic composition [G] was applied using a wire bar and dried to a dye weight of 0.5 g/m², and the protective composition [I] was then applied thereto and dried to a dry weight of 3.5 g/m². The resulting article was subjected to calendering to a smoothness on the heat-sensitive chromogenic layer of 2000 s as measured with an Oken type smoothness tester and thereby yielded the heat-sensitive adhesive material.

Example 10

A heat-sensitive adhesive material of the present invention was prepared by the following procedures. Specifically, to an opposite side to the heat-sensitive adhesive layer of the heat-sensitive adhesive material obtained in Example 7, the heat-sensitive chromogenic composition [G] was applied using a wire bar and dried to a dye weight of 0.5 g/m², and the protective composition [I] was then applied thereto and dried to a dry weight of 3.5 g/m². The resulting article was subjected to calendering to a smoothness on the heat-sensitive chromogenic layer of 2000 s as measured with an Oken type smoothness tester and thereby yielded the heat-sensitive adhesive material.

Example 11

A heat-sensitive adhesive material of the present invention was prepared by the following procedures. Specifically, to an opposite side to the heat-sensitive adhesive layer of the heat-sensitive adhesive material obtained in Example 8, the heat-sensitive chromogenic composition [G] was applied using a wire bar and dried to a dye weight of 0.5 g/m², and the protective composition [I] was then applied thereto and dried to a dry weight of 3.5 g/m². The resulting article was subjected to calendering to a smoothness on the heat-sensitive chromogenic layer of 2000 s as measured with an Oken type smoothness tester and thereby yielded the heat-sensitive adhesive material.

Example 12

(1) Preparation of Underlying Layer Composition [J]

To 4.0 parts of a hollow particle emulsion (ratio of hollowness: 50%, solid content: 25%) were added 0.4 part of styrene-butadiene latex (solid content: 50%), 1.0 part of 10% poly(vinyl alcohol) aqueous solution and 1.1 parts of water and thereby yielded an underlying layer composition [J].

(2) Preparation of Heat-sensitive Adhesive Material

A heat-sensitive adhesive material was prepared in the same manner as in Example 8, except the following procedures. Specifically, the underlying layer composition [J] was applied to a dry weight of 3.0 g/m² between the heat-sensitive adhesive layer and the substrate, and to an opposite side thereto, the heat-sensitive chromogenic composition [G] was applied using a wire bar and dried to a dye weight of 0.5 g/m², and the protective composition [I] was then applied thereto and dried to a dry weight of 3.5 g/m². The resulting article was subjected to calendering to a smoothness on the heat-sensitive chromogenic layer of 2000 s as measured with an Oken type smoothness tester and thereby yielded the heat-sensitive adhesive material.

Comparative Example 3

A heat-sensitive adhesive material as a comparative example was prepared in the same manner as in Comparative Example 1, except the following procedures. Specifically, to an opposite side to the heat-sensitive adhesive layer of the heat-sensitive adhesive material obtained in Comparative Example 1, the heat-sensitive chromogenic composition [G] was applied using a wire bar and dried to a dye weight of 0.5 g/m², and the protective composition [I] was then applied thereto and dried to a dry weight of 3.5 g/m². The resulting article was subjected to calendering to a smoothness on the heat-sensitive chromogenic layer of 2000 s as measured with an Oken type smoothness tester and thereby yielded the heat-sensitive adhesive material.

Comparative Example 4

A heat-sensitive adhesive material as a comparative example was prepared in the same manner as in Comparative Example 2, except the following procedures. Specifically, to an opposite side to the heat-sensitive adhesive layer of the heat-sensitive adhesive material obtained in Comparative Example 2, the heat-sensitive chromogenic composition [G] was applied using a wire bar and dried to a dye weight of 0.5 g/m², and the protective composition [I] was then applied thereto and dried to a dry weight of 3.5 g/m². The resulting article was subjected to calendering to a smoothness on a heat-sensitive chromogenic layer of 2000 s as measured with an Oken type smoothness tester and thereby yielded the heat-sensitive adhesive material.

(c) Adhesion at 5° C. and 15% RH

A sample heat-sensitive adhesive material was cut to a rectangular piece 4.0 cm wide and 9.0 cm long, and the heat-sensitive chromogenic layer and the heat-sensitive adhesive layer were successively activated in this order by heating using a thermal printer that can apply heat continuously. Specifically, heat was applied to the heat-sensitive chromogenic layer at energy applied to thermal head of 0.54 mJ/dot, a printing speed of 4 ms/line, and a platen pressure of 6 kgf/line. Subsequently, the heat-sensitive adhesive layer was activated by heating at energy applied to thermal head of 0.54 mJ/ dot, a printing speed of 4 ms/line, and a platen pressure of 6 kgf/line. The activated heat-sensitive adhesive material was applied to an adherend [polyolefin (PO) and vinyl chloride wrap] in a longitudinal direction using a rubber roller under a load of 2 kg and was peeled off at a peel angle of 180° and a peel rate of 300 mm/min, one minute later. The resistance in this procedure was indicated as the adhesive strength by the gf/40-mm. The optical density of the activated heat-sensitive chromogenic layer was determined using a Macbeth reflection densitometer (Model RD-914).

(d) Adhesion and Thermal Printing Property at 30° C. and 65% RH

A sample heat-sensitive adhesive material was cut to a rectangular piece 4.0 cm wide and 9.0 cm long, and the heat-sensitive chromogenic layer and the heat-sensitive adhesive layer were successively activated in this order by heating using a thermal printer that can apply heat continuously. Specifically, heat was applied to the heat-sensitive chromogenic layer at energy applied to thermal head of 0.54 mJ/dot, a printing speed of 4 ms/line, and a platen pressure of 6 kgf/line. Subsequently, the heat-sensitive adhesive layer was activated by heating at energy applied to thermal head of 0.23 mJ/dot, a printing speed of 4 ms/line, and a platen pressure of 6 kgf/line. The activated heat-sensitive adhesive material was applied to an adherend [polyolefin (PO) and vinyl chloride wrap] in a longitudinal direction using a rubber roller under a load of 2 kg and was peeled off at a peel angle of 180° and a peel rate of 300 mm/min, one minute later. The resistance in this procedure was indicated as the adhesive strength by the gf/40-mm. The optical density of the activated heat-sensitive chromogenic layer was determined using a Macbeth reflection densitometer (Model RD-914).

(e) Bleeding

A sample heat-sensitive adhesive material was cut to a rectangular piece 4.0 cm wide and 9.0 cm long, and the heat-sensitive adhesive layer was activated by heating using a thermal printer (available from Okura Electric Co., Ltd., under the trade name of TH-PMD) at energy applied to thermal head of 0.70 mJ/dot, a printing speed of 4 ms/line, and a platen pressure of 6 kgf/line. The bleeding of the heat-sensitive chromogenic layer was visually inspected and was rated according to the following criteria:

⊚: No bleeding
○: Slight bleeding
Δ: Bleeding clearly observed (f) Blocking Property The protective layer on the thermal recording layer was brought into contact with the heat-sensitive adhesive layer of the same sample and was allowed to stand at 50° C. at a pressure of 2 kg/cm² under dry conditions for 24 hours. The resulting sample was left to stand at room temperature, and the two layers of the sample were peeled off. In this procedure, the blocking property of the sample was determined according to the following rating.

TABLE 8

| Rating | Hang-up | Peeling sound | Dotted transfer | Peeling |
|---|---|---|---|---|
| 10 | no | | | |
| 9 | slightly | no | | |
| 8 | yes | slightly | | |
| 7 | | yes | | |
| 6 | | | partially | |
| 5 | | | 30–50% | |
| 4 | | | 50%–whole | |
| 3 | | | | partially |
| 2 | | | | 30–50% |
| 1 | | | | 50%–whole |

TABLE 9

| | Adhesion to PO wrap (gf / 40-mm) | | Optical density of heat-sensitive chromogenic layer | | Bleeding | Peel resistance property |
|---|---|---|---|---|---|---|
| | 5° C. / 15% | 80° C. / 65% | 5° C. / 15% | 80° C. / 65% | | |
| Example 9 | 3012 | 2412 | 1.44 | 1.42 | ○ | 8 |
| Example 10 | 3166 | 2397 | 1.45 | 1.44 | ○ | 10 |
| Example 11 | 3365 | 2548 | 1.45 | 1.43 | ○ | 10 |
| Example 12 | 3592 | 2822 | 1.43 | 1.44 | ⊚ | 10 |
| Comp. Ex. 3 | 2348 | 413 | 1.44 | 1.43 | ○ | 5 |
| Comp. Ex. 4 | 3120 | 23 | 1.42 | 1.44 | ○ | 3 |

What is claimed is:

1. A heat-sensitive adhesive material comprising:
   a substrate;
   a heat-sensitive adhesive layer containing a thermoplastic resin and a solid plasticizer formed on the substrate; and
   fine composite particles comprising a heat-fusible substance and a thermal-response retarder,
   wherein the heat-fusible substance is capable of depressing the solidifying point of the solid plasticizer, is present in at least one of the heat-sensitive adhesive layer and a layer adjacent to the heat-sensitive adhesive layer, and satisfies the following condition (A):
   (A): $E1 < E2$
   where $E1$ is a heat energy to fuse the solid plasticizer $E2$ is a heat energy to fuse the heat-fusible substance, and the thermal-response retarder functions as to increase the heat energy $E2$.

2. A heat-sensitive adhesive material according to claim 1, wherein the content of the heat-fusible substance contained in a single one of the fine composite particles is 5% to 50% with respect to the total amount of the single one of the fine particles.

3. A heat-sensitive adhesive material according to claim 1, wherein the fine composite particles have an average particle diameter of 0.5 to 50.0 μm.

4. A heat-sensitive adhesive material according to claim 1, wherein the heat-fusible substance has a melting point of 60° C. to 150° C.

5. A heat-sensitive adhesive material according to claim 1, wherein the fine composite particles contain fine airspace dispersed inside thereof.

6. A heat-sensitive adhesive material according to claim 1, wherein the heat-fusible substance is a compound having a molecular structure having a same functional group skeleton with the solid plasticizer.

7. A heat-sensitive adhesive material according to claim 1, wherein the thermal-response retarder is an acrylonitrile-styrene resin.

8. A heat-sensitive adhesive material according to claim 1, wherein the thermoplastic resin comprises 2-ethyihexyl acrylate, and the solid plasticizer comprises at least one selected from the following compounds (a), (b) and (c):

compound (a)

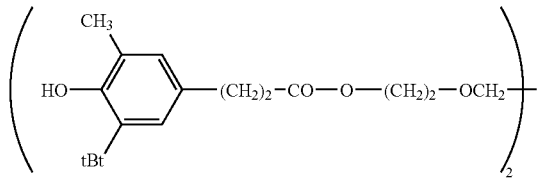

compound (b)

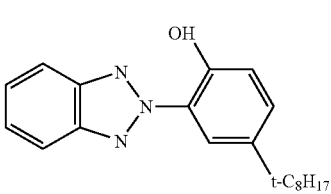

compound (c)

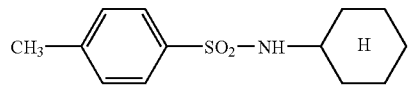

where tBt in compound (a) expresses tertiary butyl.

9. A heat-sensitive adhesive material according to claim 1, further comprising a thermal recording layer which contains a leuco dye and a developer, formed on the substrate on the opposite side to the heat-sensitive adhesive layer.

10. A heat-sensitive adhesive material according to claim 1, further comprising an underlying layer which comprises an airspace layer formed between the heat-sensitive adhesive layer and the substrate.

* * * * *